(12) United States Patent
Wolfe

(10) Patent No.: US 9,004,258 B2
(45) Date of Patent: Apr. 14, 2015

(54) APPARATUS AND METHOD FOR OFFSETTING CONVEYOR

(71) Applicant: Telsmith, Inc., Mequon, WI (US)

(72) Inventor: Dean Wolfe, West Bend, WI (US)

(73) Assignee: Telsmith, Inc., Mequon, WI (US)

( * ) Notice: Subject to any disclaimer, the term of this patent is extended or adjusted under 35 U.S.C. 154(b) by 0 days.

(21) Appl. No.: 13/972,239

(22) Filed: Aug. 21, 2013

(65) Prior Publication Data

US 2014/0054131 A1 Feb. 27, 2014

Related U.S. Application Data

(60) Provisional application No. 61/742,885, filed on Aug. 21, 2012.

(51) Int. Cl.
| | | |
|---|---|---|
| *B65G 47/46* | (2006.01) | |
| *B65G 65/42* | (2006.01) | |
| *B65G 21/00* | (2006.01) | |
| *B65G 21/12* | (2006.01) | |

(52) U.S. Cl.
CPC .............. *B65G 47/46* (2013.01); *B65G 21/12* (2013.01); *B65G 65/42* (2013.01)

(58) Field of Classification Search
None
See application file for complete search history.

(56) References Cited

U.S. PATENT DOCUMENTS

| | | |
|---|---|---|
| 2,696,289 A | 12/1954 | Lehman |
| 3,884,346 A | 5/1975 | O'Neill et al. |
| 7,296,676 B2 * | 11/2007 | Smith et al. ............... 198/861.4 |
| 2008/0210145 A1 | 9/2008 | Petersen et al. |

* cited by examiner

*Primary Examiner* — Kavel Singh
(74) *Attorney, Agent, or Firm* — Chambliss, Bahner & Stophel, P.C.

(57) ABSTRACT

A conveyor assembly adapted to convey material comprising an offsetting conveyor having an offsetting conveyor tail end, an offsetting conveyor swing end, and an offsetting conveyor belt and being adapted to move between an offsetting conveyor centered position an offsetting conveyor angled position, and an offsetting conveyor offset position. The preferred conveyor assembly also comprises an offsetting conveyor swing actuator that is adapted to move the offsetting conveyor between the offsetting conveyor centered position and the offsetting conveyor angled position. The preferred conveyor assembly further comprises a chute having a chute feed end and a chute discharge end and being adapted to move between a chute centered position and a chute angled position. The preferred conveyor assembly still further comprises a chute actuator that is adapted to move the chute between the chute centered position and the chute angled position. A method for moving an offsetting conveyor.

22 Claims, 18 Drawing Sheets

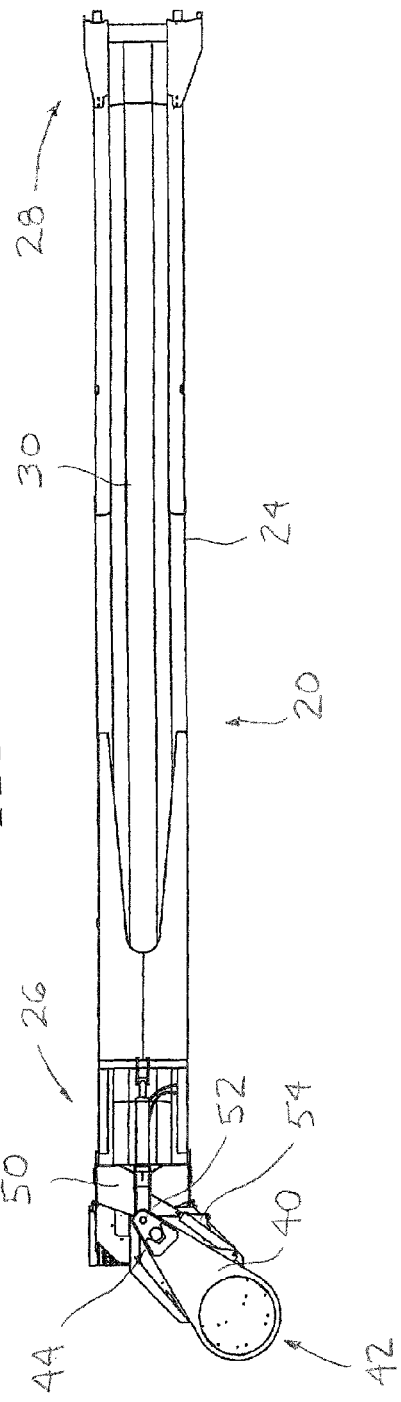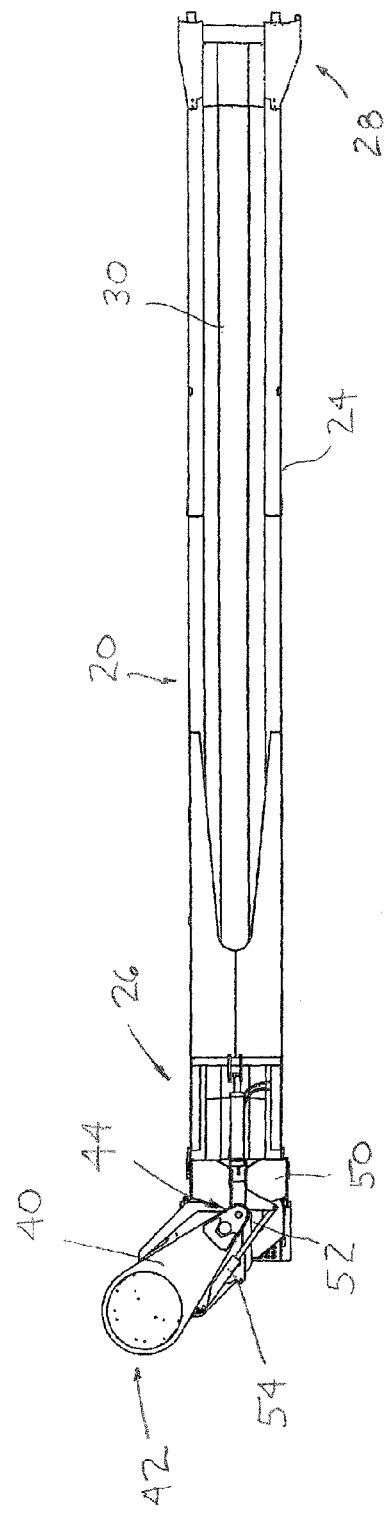

APPARATUS AND METHOD FOR OFFSETTING CONVEYOR

CROSS-REFERENCES TO RELATED APPLICATIONS/PATENTS

This application relates back to and claims priority from U.S. Provisional Application for Patent No. 61/742,885 entitled "Offsetting Conveyor Design" and filed on Aug. 21, 2012.

FIELD OF THE INVENTION

The present invention relates generally to conveyors adapted to convey materials, and particularly to conveyors adapted to convey materials between crushing assemblies, screening assemblies and stockpiles.

BACKGROUND AND DESCRIPTION OF THE PRIOR ART

It is known to use conveyors to convey aggregate materials. Conventional conveyors, however, suffer from one or more disadvantages. For example, conventional conveyors are disposed on the centerline of crushing and/or screening assemblies. As a result, conventional conveyors interfere with each other when aggregate materials are recirculated from the screening assembly back to the crushing assembly. Conventional conveyors also do not permit the offsetting conveyor to be pivotally swung so as to be offset to either side of the feed conveyor. Conventional conveyors further require multiple conveyor units to convey aggregate materials between stockpiles, crushing assemblies and screening assemblies. Still further, conventional conveyors are expensive to transport, operate and maintain and operate and labor intensive to set up and operate. In addition, conventional conveyors provide only a limited range of stockpiling and material size capabilities.

It would be desirable, therefore, if an apparatus and method for a conveyor assembly could be provided that would not interfere with each other when aggregate materials are recirculated from the screening assembly back to the crushing assembly. It would also be desirable if such an apparatus and method for a conveyor assembly could be provided that would permit the offsetting conveyor to be pivotally swung so as to be offset to either side of the feed conveyor. It would be further desirable if such an apparatus and method for a conveyor assembly could be provided that would not require multiple conveyor units to convey aggregate materials between stockpiles, crushing assemblies and screening assemblies. It would be still further desirable if such an apparatus and method for a conveyor assembly could be provided that would be less expensive to transport, operate and maintain and operate and less labor intensive to set up and operate. In addition, it would be desirable if such an apparatus and method for a conveyor assembly could be provided that would provide a broader range of stockpiling and material size capabilities.

ADVANTAGES OF THE PREFERRED EMBODIMENTS OF THE INVENTION

Accordingly, it is an advantage of the preferred embodiments of the invention claimed herein to provide an apparatus and method for a conveyor assembly that does not interfere with other conveyors when aggregate materials are recirculated from the screening assembly back to the crushing assembly. It is also an advantage of the preferred embodiments of the invention claimed herein to provide an apparatus and method for a conveyor assembly that permits the offsetting conveyor to be pivotally swung so as to be offset to either side of the feed conveyor. It is a further advantage of the preferred embodiments of the invention claimed herein to provide an apparatus and method for a conveyor assembly that does not require multiple conveyor units to convey aggregate materials between stockpiles, crushing assemblies and screening assemblies.

It is a still further advantage of the preferred embodiments of the invention claimed herein to provide an apparatus and method for a conveyor assembly that is less expensive to transport, operate and maintain and less labor intensive to set up and operate. In addition, it is an advantage of the preferred embodiments of the invention claimed herein to provide an apparatus and method for a conveyor assembly that provides a broader range of stockpiling and material size capabilities.

Additional advantages of the preferred embodiments of the invention will become apparent from an examination of the drawings and the ensuing description.

EXPLANATION OF THE TECHNICAL TERMS

As used herein, the term "actuator" means shall mean any device, mechanism, assembly or combination thereof that is adapted to move or be moved between a retracted position and an extended position so as to impart a mechanical force. The term "actuator" shall include without limitation linear actuators, rotary actuators, hydraulic cylinders, hydraulic rotary actuators, pneumatic cylinders, springs and the like.

As used herein, the term "oversize" means too large to pass through the screens of the screening assembly used for a particular operation. The term "oversize" includes material that may vary in size from smaller than 0.5 inches to more than 12 inches depending upon the type of screening assembly being used for a particular operation.

SUMMARY OF THE INVENTION

The apparatus of the invention comprises a conveyor assembly adapted to convey material. The preferred conveyor assembly comprises an offsetting conveyor having an offsetting conveyor tail end, an offsetting conveyor swing end, and an offsetting conveyor belt. The preferred offsetting conveyor is adapted to move between an offsetting conveyor centered position an offsetting conveyor angled position, and an offsetting conveyor offset position. The preferred conveyor assembly also comprises an offsetting conveyor swing actuator that is adapted to move the offsetting conveyor between the offsetting conveyor centered position and the offsetting conveyor angled position. The preferred conveyor assembly further comprises a chute having a chute feed end and a chute discharge end. The preferred chute is adapted to move between a chute centered position and a chute angled position. The preferred conveyor assembly still further comprises a chute actuator that is adapted to move the chute between the chute centered position and the chute angled position.

The method of the invention comprises a method for offsetting a conveyor. The preferred method for offsetting a conveyor comprises providing a conveyor assembly adapted to convey material. The preferred conveyor assembly comprises an offsetting conveyor having an offsetting conveyor tail end, an offsetting conveyor swing end, and an offsetting conveyor belt. The preferred offsetting conveyor is adapted to move between an offsetting conveyor centered position an offsetting conveyor angled position, and an offsetting conveyor offset position. The preferred conveyor assembly also comprises an offsetting conveyor swing actuator that is adapted to move the offsetting conveyor between the offsetting conveyor centered position and the offsetting conveyor angled position. The preferred conveyor assembly further comprises a chute having a chute feed end and a chute discharge end. The preferred chute is adapted to move between a chute centered position and a chute angled position. The preferred conveyor assembly still further comprises a chute actuator that is adapted to move the chute between the chute centered position and the chute angled position. The preferred method also comprises moving the offsetting conveyor between the offsetting conveyor centered position and the offsetting conveyor offset position.

BRIEF DESCRIPTION OF THE DRAWINGS

The presently preferred embodiments of the invention are illustrated in the accompanying drawings, in which like reference numerals represent like parts throughout, and in which:

FIG. 9 is a top view of preferred conveyor assembly 20 showing offsetting conveyor 24 in an offset position to the left.

FIG. 10 is a top view of preferred conveyor assembly 20 showing offsetting conveyor 24 in an offset position to the right.

DESCRIPTION OF THE PREFERRED EMBODIMENTS OF THE INVENTION

Figure 1:
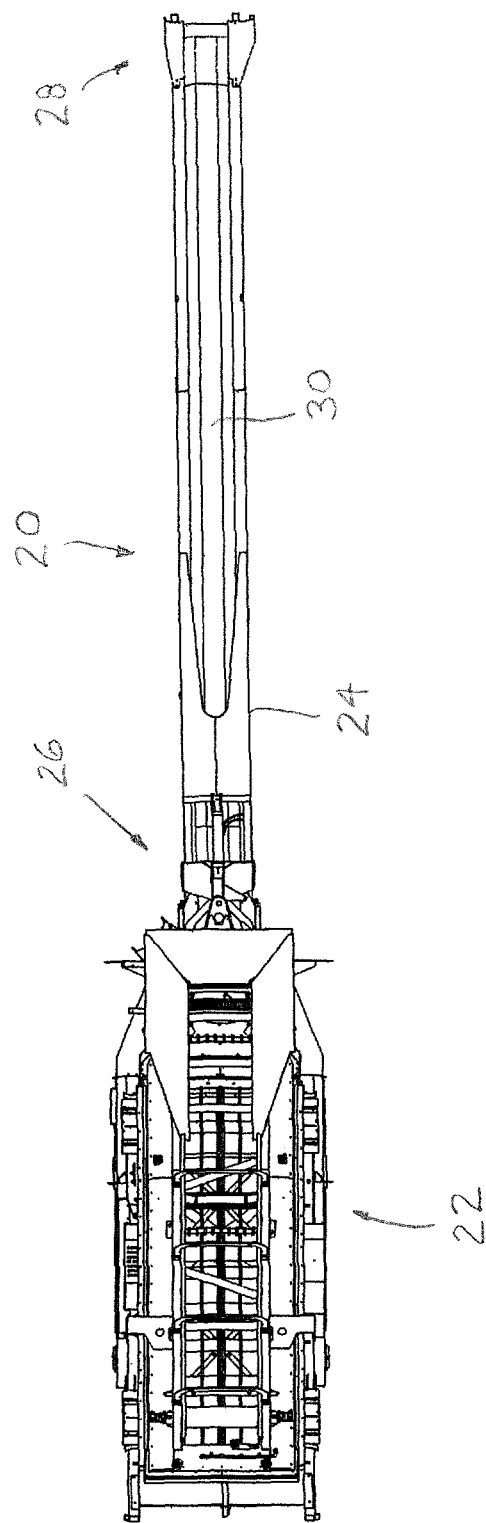
FIG. 1 is a top view of preferred conveyor assembly 20 mounted on an exemplary screening assembly in a centered position in accordance with the present invention.

Referring now to the drawings, the preferred embodiment of the apparatus and method for an offsetting conveyor assembly in accordance with the present invention is illustrated by FIGS. 1 through 28. As shown in FIGS. 1-28, the preferred embodiments of the offsetting conveyor assembly are adapted to provide an apparatus and method for a conveyor assembly that does not interfere with other conveyors when materials are recirculated from a screening assembly back to a crushing assembly. The preferred embodiments of the offsetting conveyor assembly also provide an apparatus and method for a conveyor assembly that permits the offsetting conveyor to be pivotally swung so as to be offset to either side of a feed conveyor. The preferred embodiments of the offsetting conveyor assembly further provide an apparatus and method for a conveyor assembly that does not require multiple conveyor units to convey aggregate materials between stockpiles, crushing assemblies and screening assemblies. The preferred embodiments of the offsetting conveyor assembly still further provide an apparatus and method for a conveyor assembly that is less expensive to transport, operate and maintain and less labor intensive to set up and operate. In addition, the preferred embodiments of the offsetting conveyor assembly provide an apparatus and method for a conveyor assembly that provides a broader range of stockpiling and material size capabilities.

Referring now to FIG. 1, a top view of the preferred embodiment of the conveyor assembly mounted on an exemplary screening assembly in a centered position in accordance with the present invention is illustrated. As shown in FIG. 1, the preferred conveyor assembly is designated generally by reference numeral 20. Preferred conveyor assembly 20 is adapted to convey material such as rock, gravel, sand and the like. More particularly, preferred conveyor assembly 20 is adapted to convey material between items of equipment and stockpiles. Preferably, conveyor assembly 20 is adapted to convey material from exemplary screening assembly 22 to a crushing assembly or from screening assembly 22 to a stockpile. Preferred conveyor assembly 20 comprises offsetting conveyor 24 having offsetting conveyor tail end 26, offsetting conveyor swing end 28, and offsetting conveyor belt 30. Preferred offsetting conveyor 24 is also adapted to move between the offsetting conveyor centered position illustrated in FIGS. 1 and 4, offsetting conveyor offset positions (see, e.g., FIGS. 2-3, 5-6 and 9-10) and offsetting conveyor angled positions (see, e.g., FIGS. 7-8). While FIG. 1 illustrates the preferred configuration and arrangement of the conveyor assembly in accordance with the present invention, it is contemplated within the scope of the invention that the conveyor assembly may be of any suitable configuration and arrangement. It is also contemplated within the scope of the invention that the conveyor assembly may be used with a variety of different types of equipment, including without limitation, a pair of crushing assemblies, a pair of screening assemblies, and that the conveyor assembly may be used to convey material from a crushing assembly to a screening assembly or from a crushing assembly to a stockpile.

Figure 2:
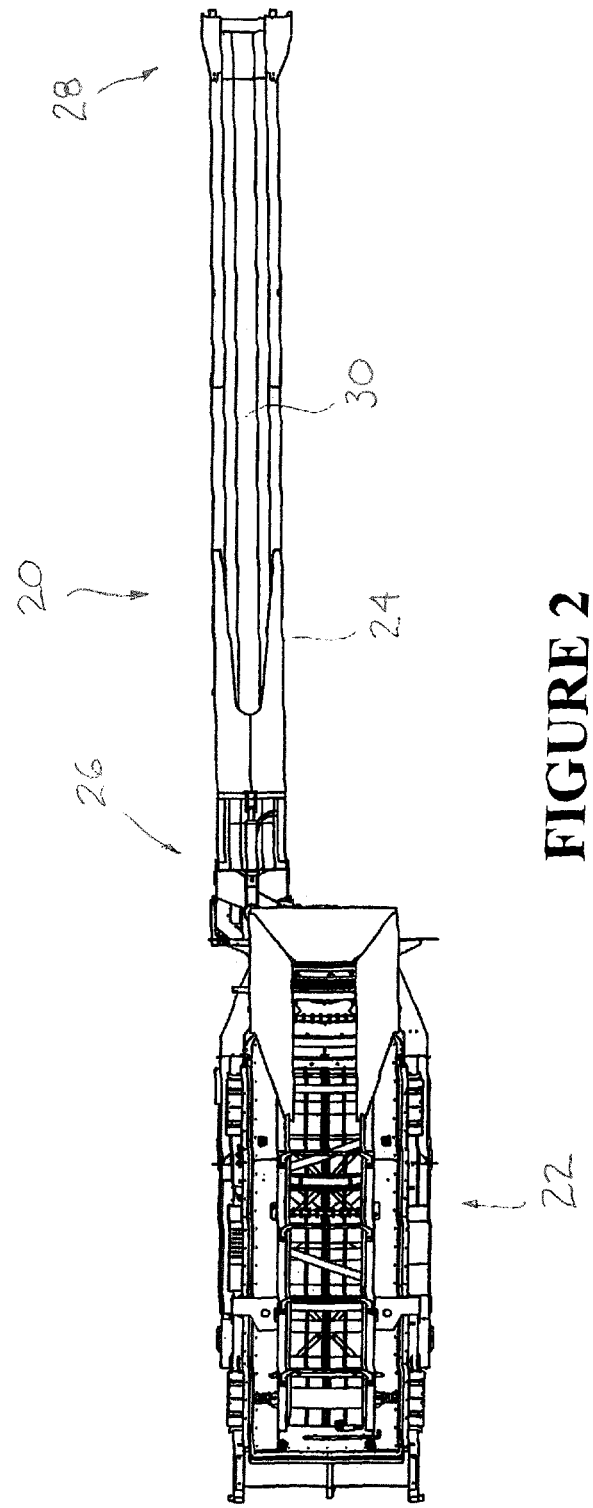
FIG. 2 is a top view of preferred conveyor assembly 20 mounted on exemplary screening assembly 22 in an offset position to the left.
Figure 5:
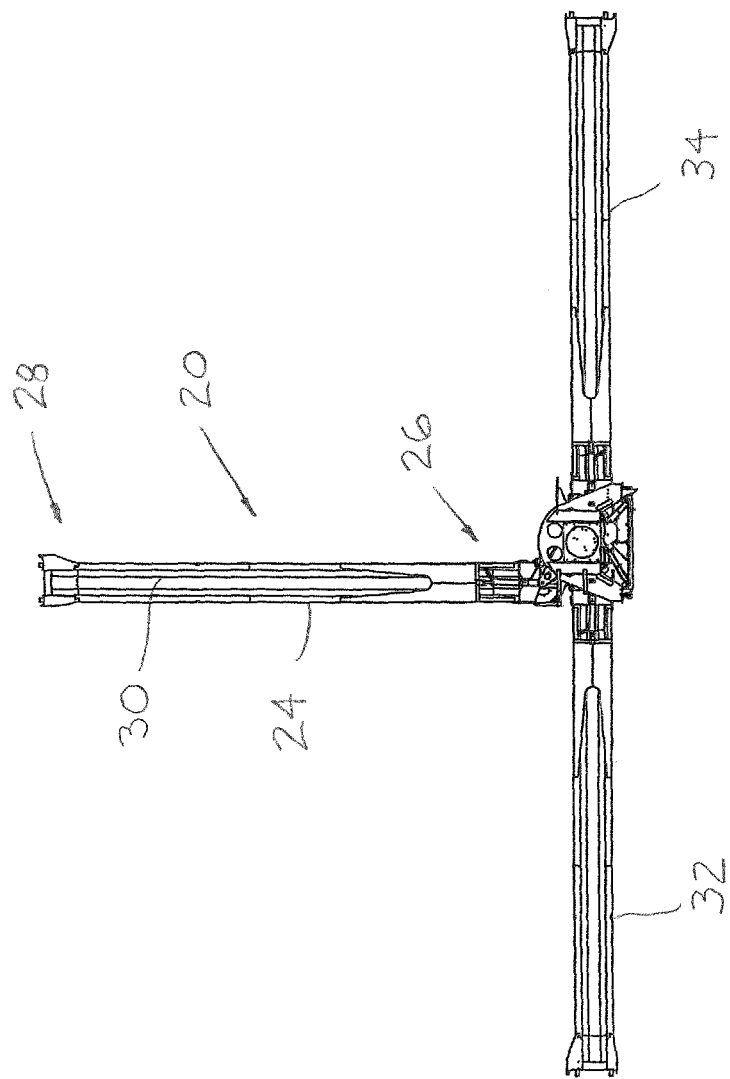
FIG. 5 is a top view of preferred conveyor assembly 20 showing offsetting conveyor 24 in an offset position to the left.

Referring now to FIG. 2, a top view of preferred conveyor assembly 20 mounted on exemplary screening assembly 22 in an offset position to the left is illustrated. As shown in FIG. 2, preferred conveyor assembly 20 comprises offsetting conveyor 24 having offsetting conveyor tail end 26, offsetting conveyor swing end 28, and offsetting conveyor belt 30. Additional views of preferred conveyor assembly 20 in the offset position to the left are illustrated in FIGS. 5 and 9.

Figure 3:
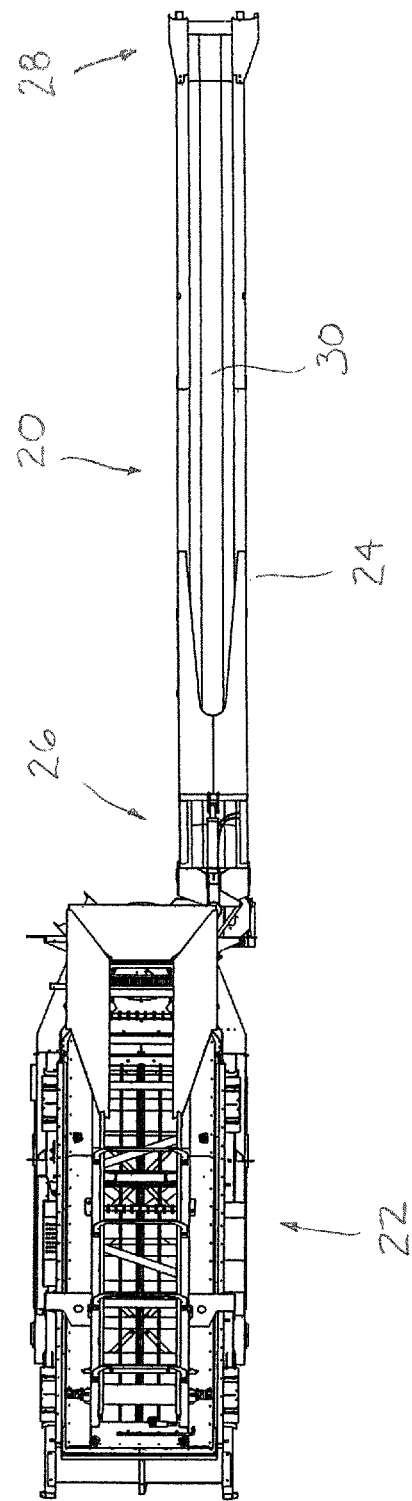
FIG. 3 is a top view of preferred conveyor assembly 20 mounted on exemplary screening assembly 22 in an offset position to the right.
Figure 4:
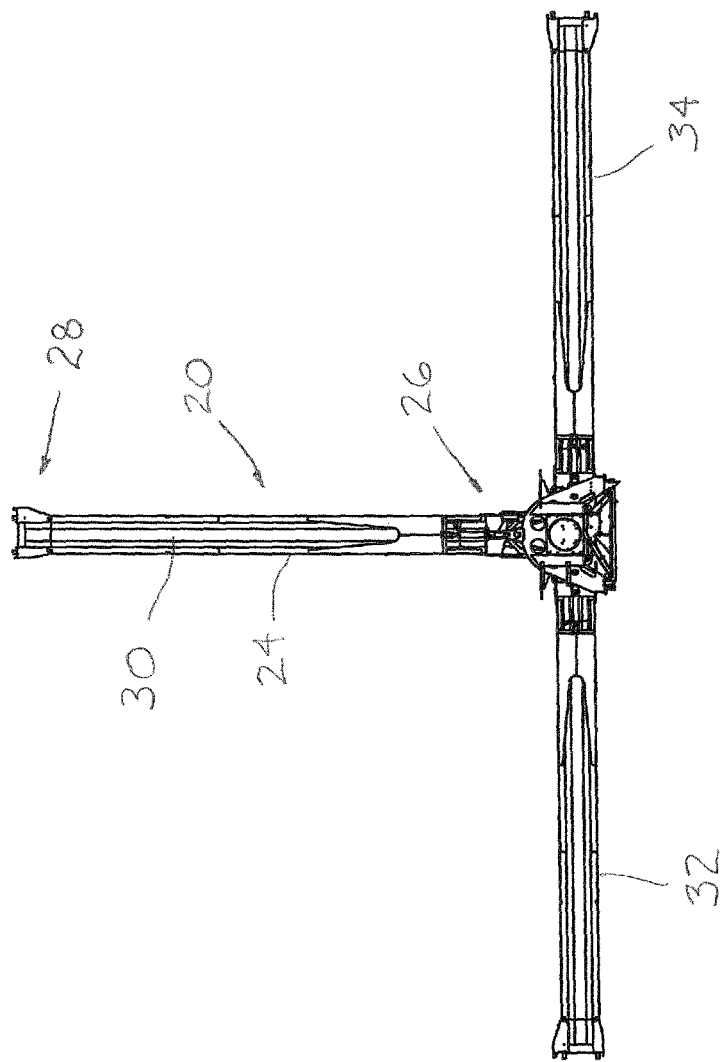
FIG. 4 is a top view of preferred conveyor assembly 20 showing offsetting conveyor 24 in the centered position.
Figure 6:
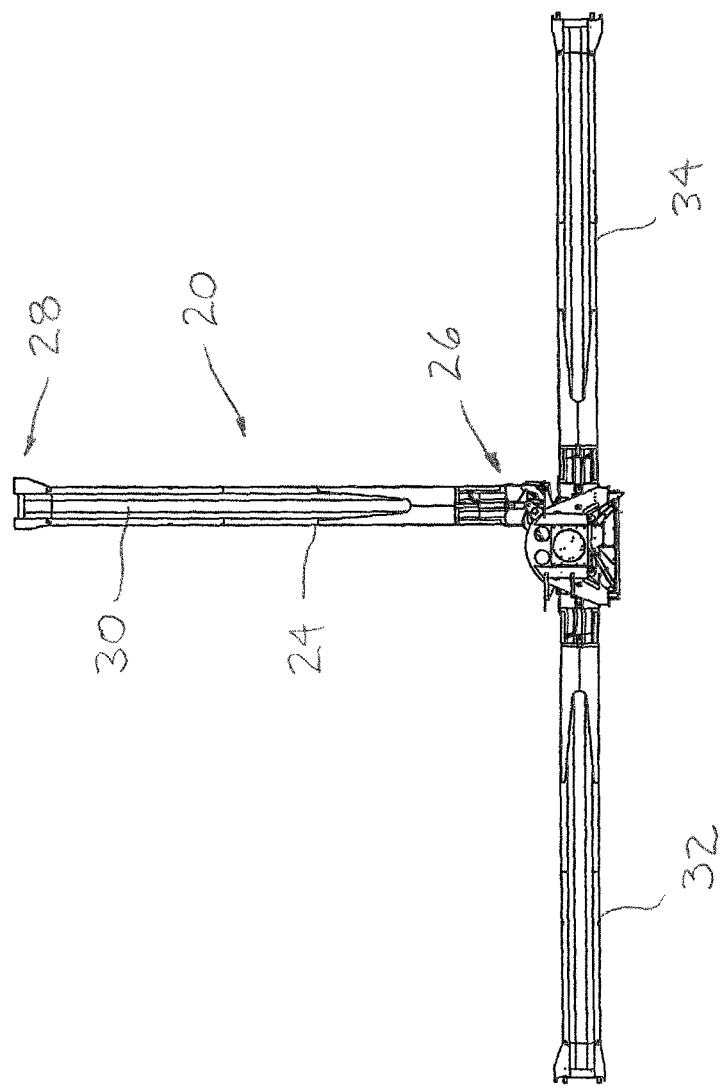
FIG. 6 is a top view of preferred conveyor assembly 20 showing offsetting conveyor 24 in an offset position to the right.

Referring now to FIG. 3, a top view of preferred conveyor assembly 20 mounted on exemplary screening assembly 22 in an offset position to the right is illustrated. As shown in FIG. 3, preferred conveyor assembly 20 comprises offsetting conveyor 24 having offsetting conveyor tail end 26, offsetting conveyor swing end 28, and offsetting conveyor belt 30. Additional views of preferred conveyor assembly 20 in the offset position to the right are illustrated in FIGS. 6 and 10. Conveyor assembly 20 comprises offsetting conveyor 24 having offsetting conveyor tail end 26, offsetting conveyor swing end 28, and offsetting conveyor belt 30. Conveyor assembly 20 comprises offsetting conveyor 24 having offsetting conveyor tail end 26, offsetting conveyor swing end 28, and offsetting conveyor belt 30.

Referring now to FIGS. 4-7, a top view of preferred conveyor assembly 20 showing offsetting conveyor 24 in the centered position, an offset position to the left, and an offset position to the right, respectively, are illustrated. As shown in FIGS. 4-7, preferred conveyor assembly 20 comprises offsetting conveyor 24 having offsetting conveyor tail end 26, offsetting conveyor swing end 28, and offsetting conveyor belt 30. In addition, preferred conveyor assembly 20 may be used with other conveyors such as conveyors 32 and 34. While FIGS. 4-7 illustrate a preferred configuration and arrangement of conveyors 32 and 34, it is contemplated within the scope of the invention that the conveyors may be of any suitable configuration and arrangement. It is also contemplated within the scope of the invention that fewer or more than two additional conveyors may be used with conveyor assembly 20.

Figure 7:
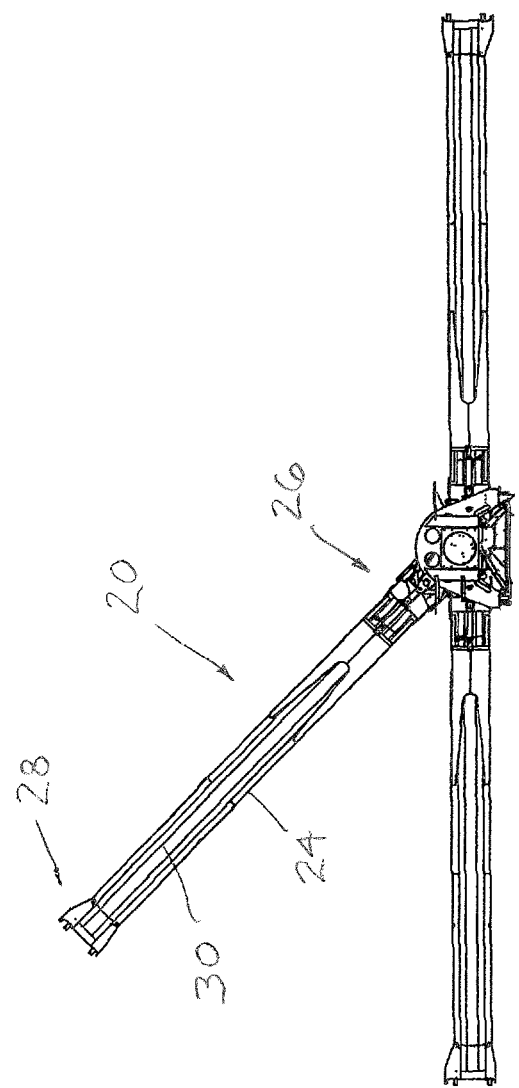
FIG. 7 is a top view of preferred conveyor assembly 20 showing offsetting conveyor 24 in an angled position to the left.
Figure 8:
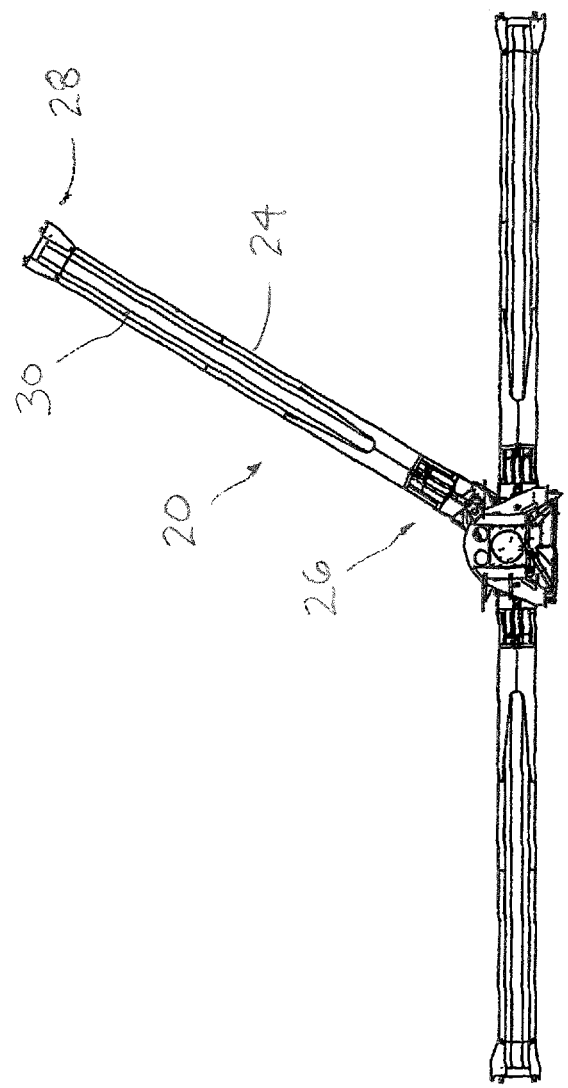
FIG. 8 is a top view of preferred conveyor assembly 20 showing offsetting conveyor 24 in an angled position to the right.

Referring now to FIGS. 7 and 8, a top view of preferred conveyor assembly 20 showing offsetting conveyor 24 in an angled position to the left and in an angled position to the right, respectively, are illustrated. As shown in FIGS. 7 and 8, preferred conveyor assembly 20 comprises offsetting conveyor 24 having offsetting conveyor tail end 26, offsetting conveyor swing end 28, and offsetting conveyor belt 30. While FIGS. 7 and 8 illustrate the offsetting conveyor in two preferred angled positions, it is contemplated within the scope of the invention that the offsetting conveyor may be disposed in any suitable angled position.

Referring now to FIG. 9, a top view of preferred conveyor assembly 20 showing offsetting conveyor 24 in an offset position to the left is illustrated. As shown in FIG. 9, preferred conveyor assembly 20 comprises offsetting conveyor 24 having offsetting conveyor tail end 26, offsetting conveyor swing end 28, and offsetting conveyor belt 30. In addition, preferred conveyor assembly 20 comprises chute 40 having chute feed end 42 and chute discharge end 44. Preferred chute 40 is adapted to be pivotally mounted on an item of equipment such as a screen assembly and move between a chute centered position (see, e.g., FIGS. 1, 4 and 15-16) and a chute angled position (see, e.g., FIGS. 2-3, 5-10 and 17-22). Preferably, chute 40 is adapted to receive oversize material from a screening assembly and pivotally move about a chute pivot axis. The preferred chute pivot axis is disposed generally vertically and adjacent to chute feed end 42. In preferred conveyor assembly 20, chute 40 is adapted to pivotally move such that chute discharge end 44 is disposed above offsetting conveyor 24 when the chute is in the chute angled position and the offsetting conveyor is in the offsetting conveyor offset position.

Still referring to FIG. 9, preferred conveyor assembly 20 further comprises offsetting conveyor pivot bracket 50. Preferred offsetting conveyor pivot bracket 50 is pivotally connected to chute 40 about bracket pivot axis 52. Preferred bracket pivot axis 52 is disposed generally vertically and adjacent to chute discharge end 44. Preferred offsetting conveyor pivot bracket 50 is adapted to pivotally move between a range of approximately +/−45 degrees from a bracket centered position (see, e.g., FIGS. 15 and 16) about bracket pivot axis 52 by offsetting conveyor swing actuator 54. In preferred conveyor assembly 20, tail end 26 of offsetting conveyor 24 is pivotally connected to conveyor pivot bracket 50 about a horizontal offsetting conveyor pivot axis. The preferred horizontal offsetting conveyor pivot axis is disposed generally horizontally and adjacent to chute discharge end 44. In preferred conveyor assembly 20, offsetting conveyor 24 is adapted to pivotally move between a range of approximately 25 degrees about the horizontal offsetting conveyor pivot axis. Preferably, offsetting conveyor 24 is pivotally moved about the horizontal offsetting conveyor pivot axis by an offsetting conveyor vertical actuator.

Referring now to FIG. 10, a top view of preferred conveyor assembly 20 showing offsetting conveyor 24 in an offset position to the right is illustrated. As shown in FIG. 10, preferred conveyor assembly 20 comprises offsetting conveyor 24 having offsetting conveyor tail end 26, offsetting conveyor swing end 28, offsetting conveyor belt 30, chute 40, pivot bracket 50 and offsetting conveyor swing actuator 54. While FIGS. 9 and 10 illustrate the preferred arrangement and configuration of the offsetting conveyor, the chute, the conveyor pivot bracket and the offsetting conveyor swing actuator, it is contemplated within the scope of the invention that the offsetting conveyor, the chute, the conveyor pivot bracket and the offsetting conveyor swing actuator may be of any suitable configuration and arrangement. It is also contemplated within the scope of the invention that more than one offsetting conveyor swing actuator may be provided.

Figure 11:
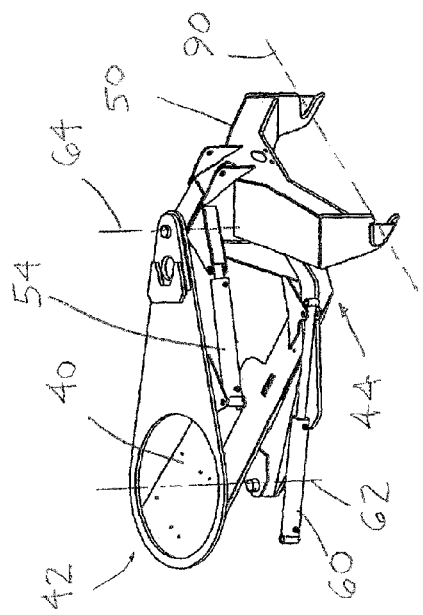
FIG. 11 is a perspective view of preferred chute 40 and bracket 50.

Referring now to FIG. 11, a perspective view of preferred chute 40 and preferred pivot bracket 50 is illustrated. As shown in FIG. 11, preferred chute 40 comprises chute feed end 42 and chute discharge end 44. In addition, preferred conveyor assembly 20 comprises chute actuator 60. Preferred chute actuator 60 is adapted to move chute 40 between the chute centered position and the chute angled position (see, e.g., FIGS. 2-3, 5-10 and 17-22) about chute pivot axis 62.

Preferably, offsetting conveyor 24 moves between the offsetting conveyor centered position and the offsetting conveyor offset position when chute actuator 60 moves chute 40 between the chute centered position and the chute offset position. In the preferred conveyor assembly 20, the offsetting conveyor 24 is pivotally connected to chute 40 about vertical offsetting conveyor pivot axis 64. Preferred vertical offsetting conveyor pivot axis 64 is generally vertical. Preferred conveyor assembly 20 also comprises offsetting conveyor swing actuator 54 which is adapted to pivotally move offsetting conveyor 24 between the offsetting conveyor centered position and the offsetting conveyor angled position (see Figures see, e.g., FIGS. 7-8) about vertical offsetting conveyor pivot axis 64. While FIG. 11 illustrates the preferred configuration and arrangement of the chute actuator, it is contemplated within the scope of the invention that the chute actuator may be of any suitable arrangement and configuration. It is also contemplated within the scope of the invention that more than one chute actuator may be provided.

Figure 12:
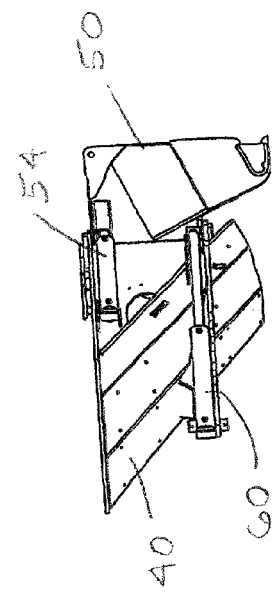
FIG. 12 is a left side view of preferred chute 40 and bracket 50.

Referring now to FIG. 12, a left side view of preferred chute 40 and preferred pivot bracket 50 is illustrated. As shown in FIG. 12, preferred chute 40 comprises chute feed end 42 and chute discharge end 44. Preferred conveyor assembly 20 also comprises chute actuator 60 and offsetting conveyor swing actuator 54.

Figure 13:
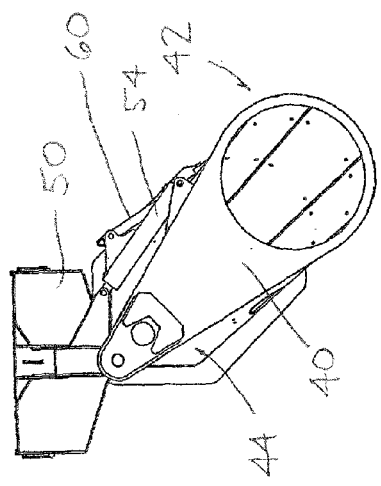
FIG. 13 is a top view of preferred chute 40 and bracket 50.

Referring now to FIG. 13, a top view of preferred chute 40 and preferred pivot bracket 50 is illustrated. As shown in FIG. 13, preferred chute 40 comprises chute feed end 42 and chute discharge end 44. Preferred conveyor assembly 20 also comprises chute actuator 60 and offsetting conveyor swing actuator 54.

Figure 14:
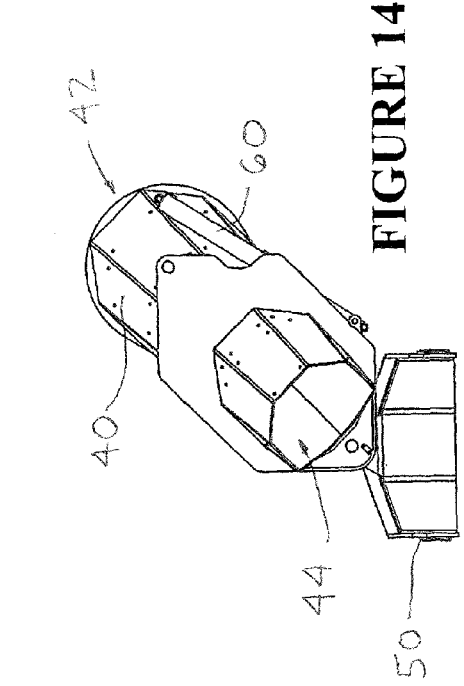
FIG. 14 is a bottom view of preferred chute 40 and bracket 50.

Referring now to FIG. 14, a bottom view of preferred chute 40 and preferred pivot bracket 50 is illustrated. As shown in FIG. 13, preferred chute 40 comprises chute feed end 42 and chute discharge end 44. Preferred conveyor assembly 20 also comprises chute actuator 60.

Figure 16:
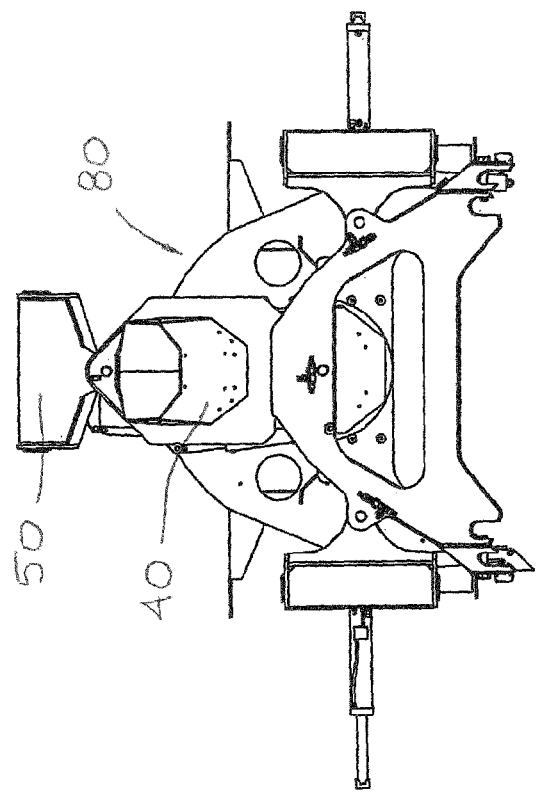
FIG. 16 is a bottom view of preferred chute 40 in the centered position and preferred bracket 50 in a centered position.
Figure 15:
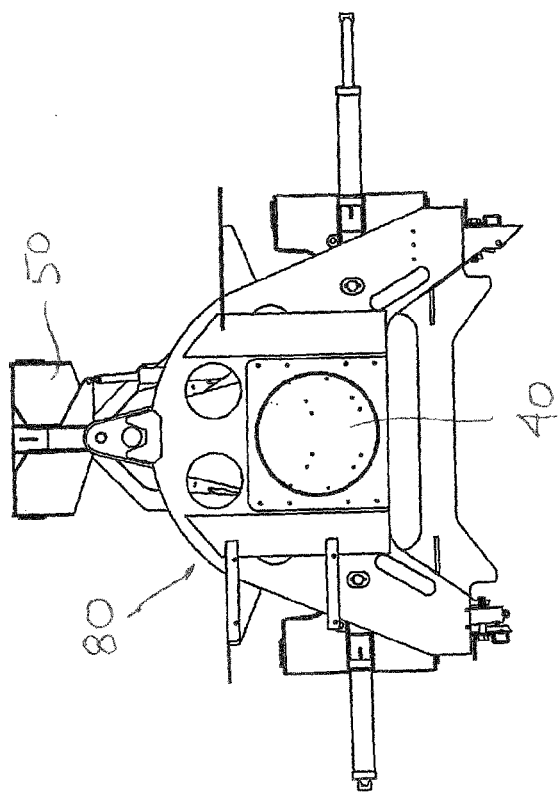
FIG. 15 is a top view of preferred chute 40 in the centered position and preferred bracket 50 in a centered position.

Referring now to FIG. 15, a top view of preferred chute 40 in the centered position and preferred pivot bracket 50 in the centered position is illustrated. As shown in FIG. 15, preferred chute 40 and bracket 50 may be housed in mounting assembly 80. FIG. 16 is a bottom view of preferred chute 40 in the centered position and preferred bracket 50 in the centered position. While FIGS. 15 and 16 illustrate the preferred configuration and arrangement of the mounting assembly, it is contemplated within the scope of the invention that the mounting assembly may be of any suitable configuration and arrangement.

Figure 18:
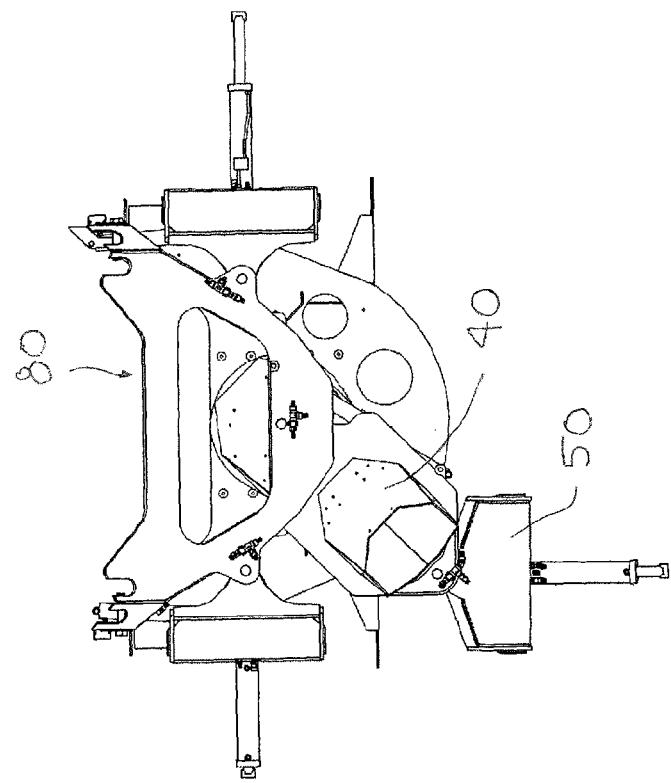
FIG. 18 is a bottom view of preferred chute 40 in an angled position to the left and preferred bracket 50 in an angled position to the right.
Figure 17:
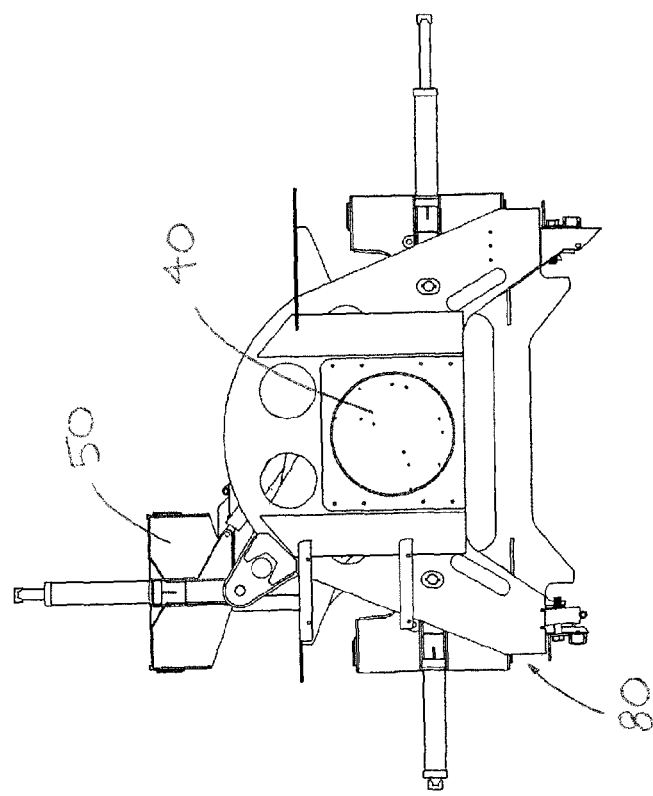
FIG. 17 is a top view of preferred chute 40 in an angled position to the left and preferred bracket 50 in an angled position to the right.

Referring now to FIG. 17, a top view of preferred chute 40 in an angled position to the left and preferred pivot bracket 50 in an angled position to the right is illustrated. As shown in FIG. 17, preferred chute 40 and bracket 50 may be housed in mounting assembly 80. FIG. 18 is a bottom view of preferred chute 40 in an angled position to the left and preferred bracket 50 in an angled position to the right.

Figure 19:
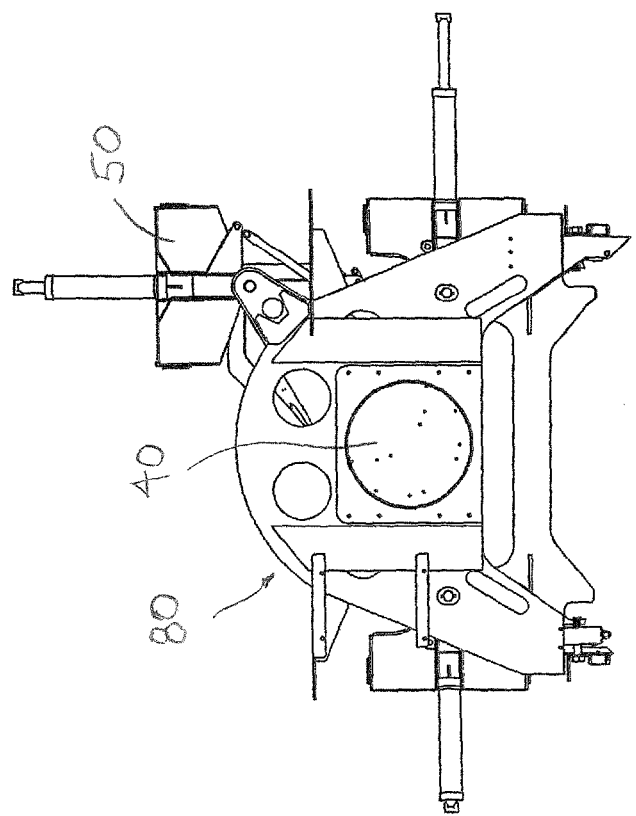
FIG. 19 is a top view of preferred chute 40 in an angled position to the right and preferred bracket 50 in an angled position to the left.
Figure 20:
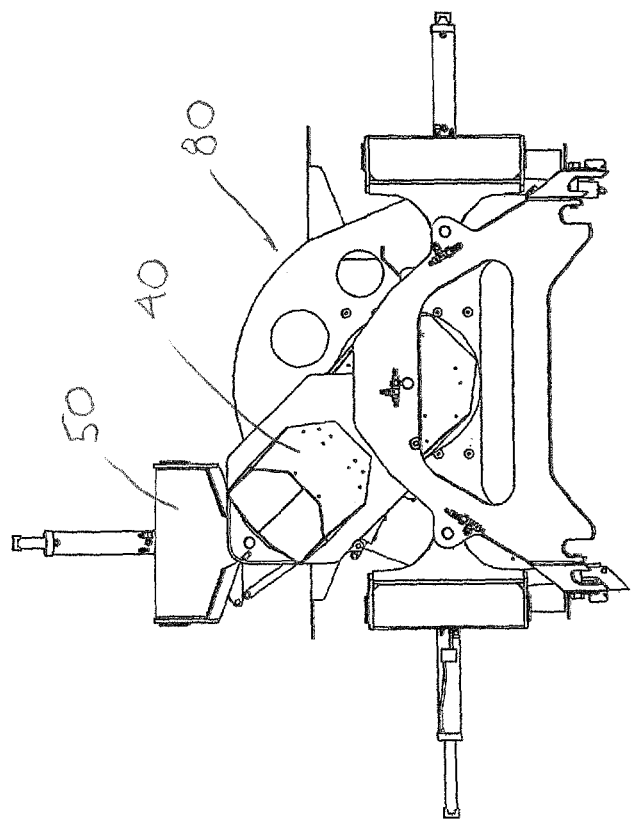
FIG. 20 is a bottom view of preferred chute 40 in an angled position to the right and preferred bracket 50 in an angled position to the left.

Referring now to FIG. 19, a top view of preferred chute 40 in an angled position to the right and preferred bracket 50 in an angled position to the left is illustrated. As shown in FIG. 19, preferred chute 40 and bracket 50 may be housed in mounting assembly 80. FIG. 20 is a bottom view of preferred chute 40 in an angled position to the right and preferred bracket 50 in an angled position to the right.

Figure 21:
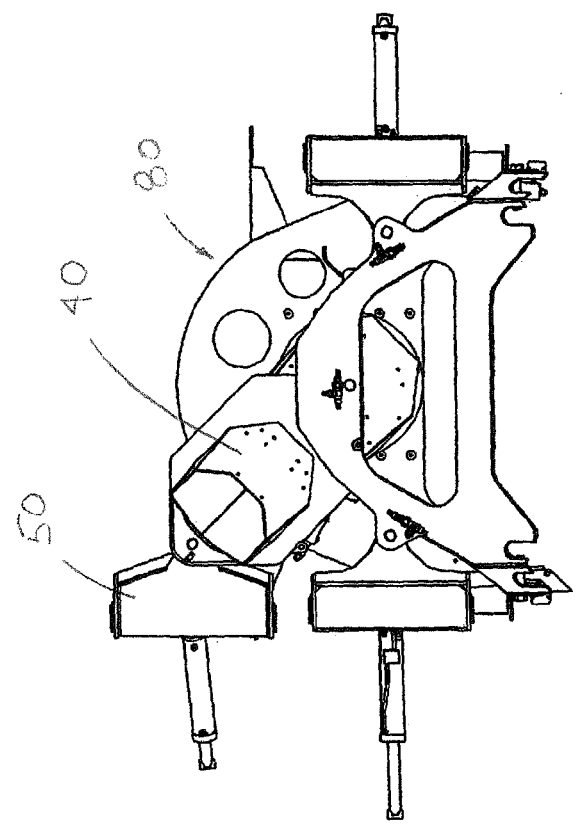
FIG. 21 is a bottom view of preferred chute 40 in an angled position to the left and preferred bracket 50 in an angled position to the left.

Referring now to FIG. 21, a bottom view of preferred chute 40 in an angled position to the left and preferred bracket 50 in an angled position to the right is illustrated. As shown in FIG. 21, preferred chute 40 and bracket 50 may be housed in mounting assembly 80.

Figure 22:
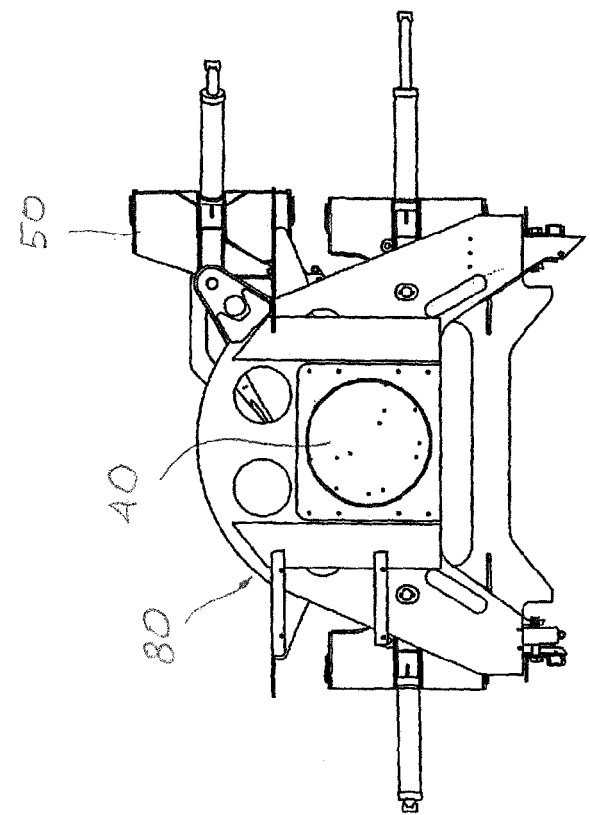
FIG. 22 is a top view of preferred chute 40 in an angled position to the right and preferred bracket 50 in an angled position to the right.

Referring now to FIG. 22, a top view of preferred chute 40 in an angled position to the right and preferred bracket 50 in an angled position to the right is illustrated. As shown in FIG. 22, preferred chute 40 and bracket 50 may be housed in mounting assembly 80.

Figure 23:
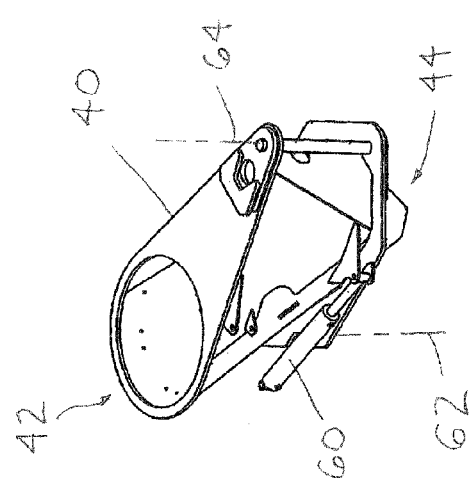
FIG. 23 is a perspective view of preferred chute 40.

Referring now to FIG. 23, a perspective view of preferred chute 40 is illustrated. As shown in FIG. 23, chute 40 comprises chute feed end 42, chute discharge end 44, chute actuator 60, chute pivot axis 62 and vertical offsetting conveyor pivot axis 64.

Figure 24:
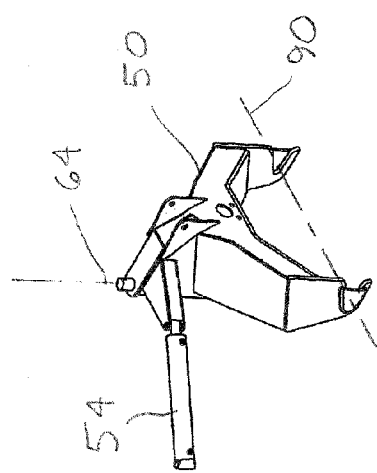
FIG. 24 is a perspective view of preferred bracket 50.

Referring now to FIG. 24, a perspective view of preferred bracket 50 is illustrated. As shown in FIG. 24, preferred bracket 50 comprises offsetting conveyor swing actuator 54 and vertical offsetting conveyor pivot axis 64.

Figure 25:
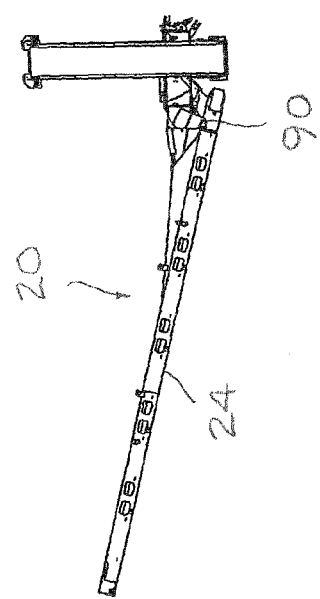
FIG. 25 is a side view of preferred conveyor assembly 20 showing offsetting conveyor 24 in a raised position.
Figure 26:
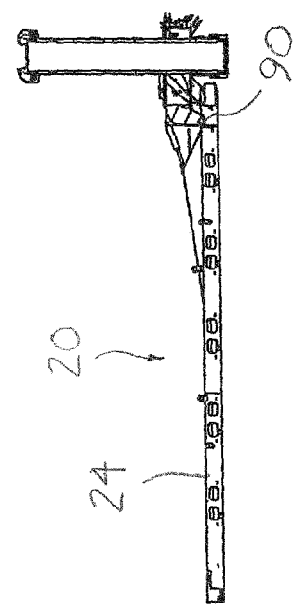
FIG. 26 is a side view of preferred conveyor assembly 20 showing offsetting conveyor 24 in a lowered position.

Referring now to FIG. 25, a side view of preferred conveyor assembly 20 showing offsetting conveyor 24 in a raised position is illustrated. FIG. 26 is a side view of preferred conveyor assembly 20 showing offsetting conveyor 24 in a lowered position is illustrated. As shown in FIGS. 25 and 26, preferred offsetting conveyor 24 is adapted to be pivotally moved about horizontal offsetting conveyor pivot axis 90.

Figure 27:
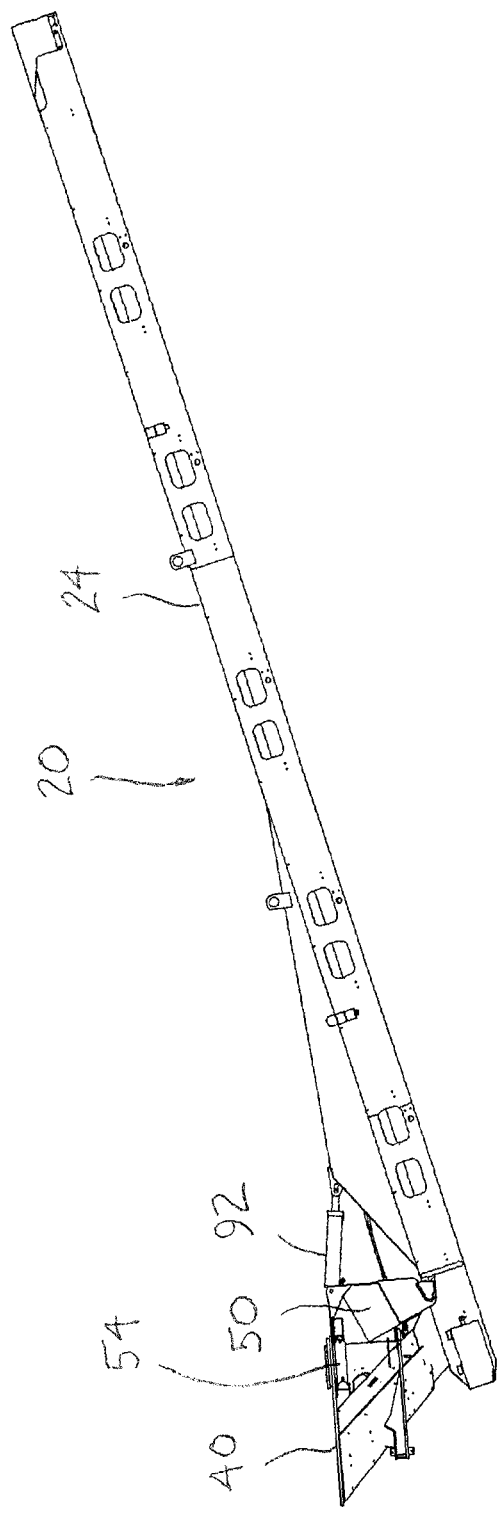
FIG. 27 is a front view of preferred conveyor assembly 20 showing offsetting conveyor 24 in a raised position.

Referring now to FIG. 27, a front view of preferred conveyor assembly 20 showing offsetting conveyor 24 in a raised position is illustrated. As shown in FIG. 27, offsetting conveyor vertical actuator 92 is adapted to move the offsetting conveyor between a raised position and a lowered position. While FIG. 27 illustrates the preferred configuration and arrangement of the offsetting conveyor vertical actuator, it is contemplated within the scope of the invention that the offsetting conveyor vertical actuator may be of any suitable arrangement and configuration. It is also contemplated within the scope of the invention that more than one offsetting conveyor vertical actuator may be provided.

Figure 28:
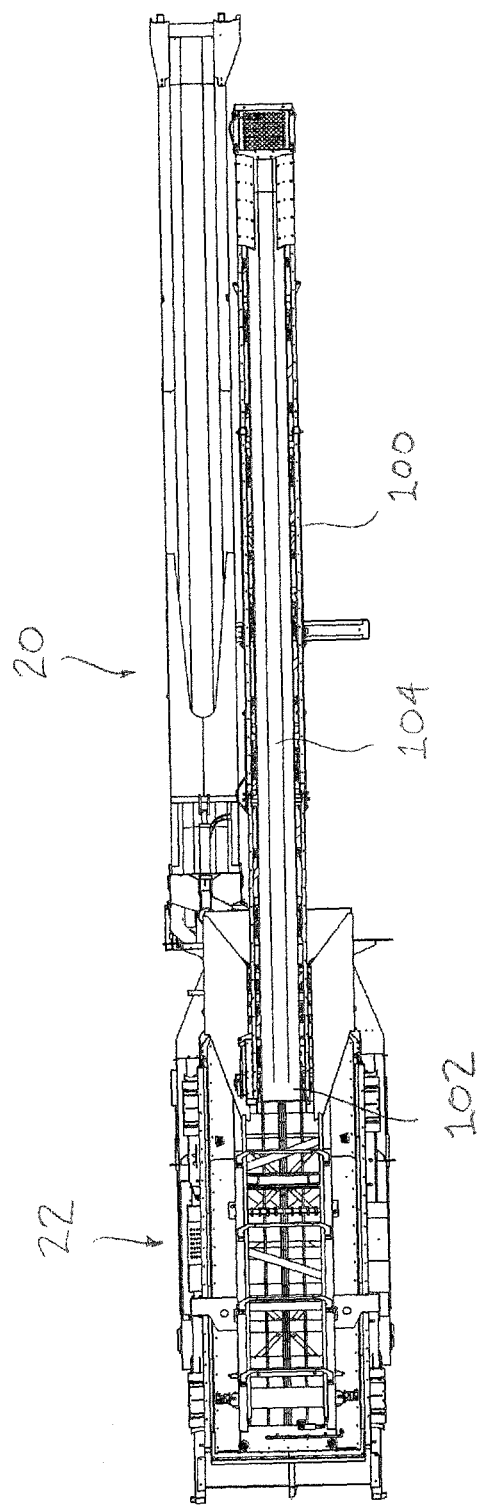
FIG. 28 is a top view of preferred conveyor assembly 20 mounted on exemplary screening assembly 22 in an offset position to the left with a feed conveyor centered on the screening assembly.

FIG. 28 is a top view of preferred conveyor assembly 20 mounted on exemplary screening assembly 22 in an offset position to the left with a feed conveyor is illustrated. As shown in FIG. 28, feed conveyor 100 has feed conveyor tail end 102 and feed conveyor belt 104. Preferred feed conveyor 100 is adapted to convey material from a crushing assembly to screening assembly 22 and is preferably centered on screening assembly 22.

The preferred embodiments of the invention also comprise a method for offsetting a conveyor. The preferred method comprises providing a conveyor assembly adapted to convey material. The preferred conveyor assembly comprises an offsetting conveyor having an offsetting conveyor tail end, an offsetting conveyor swing end, and an offsetting conveyor belt. The preferred offsetting conveyor is adapted to move between an offsetting conveyor centered position, an offsetting conveyor angled position, and an offsetting conveyor offset position. The preferred conveyor assembly also comprises an offsetting conveyor swing actuator that is adapted to move the offsetting conveyor between the offsetting conveyor centered position and the offsetting conveyor angled position. The preferred conveyor still further comprises a chute having a chute feed end and a chute discharge end. The preferred chute is adapted to move between a chute centered position and a chute angled position. In addition, the preferred conveyor assembly comprises a chute actuator that is adapted to move the chute between the chute centered position and the chute angled position. The preferred method for offsetting a conveyor also comprises moving the offsetting conveyor between the offsetting conveyor centered position and the offsetting conveyor offset position.

In operation, several advantages of the preferred embodiments of the conveyor assembly are achieved. For example, the preferred embodiments of the offsetting conveyor assembly are adapted to provide an apparatus and method for a conveyor assembly that does not interfere with other conveyors when materials are recirculated from a screening assembly back to a crushing assembly. The preferred embodiments of the offsetting conveyor assembly also provide an apparatus and method for a conveyor assembly that permits the offsetting conveyor to be pivotally swung so as to be offset to either side of a feed conveyor. The preferred embodiments of the offsetting conveyor assembly further provide an apparatus and method for a conveyor assembly that does not require multiple conveyor units to convey aggregate materials between stockpiles, crushing assemblies and screening assemblies. The preferred embodiments of the offsetting conveyor assembly still further provide an apparatus and method for a conveyor assembly that is less expensive to transport, operate and maintain and less labor intensive to set up and operate. In addition, the preferred embodiments of the offsetting conveyor assembly provide an apparatus and method for a conveyor assembly that provides a broader range of stockpiling and material size capabilities.

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

What is claimed is:

1. A conveyor assembly adapted to convey material, said conveyor assembly comprising:
   (a) an offsetting conveyor, said offsetting conveyor having an offsetting conveyor tail end, an offsetting conveyor swing end, and an offsetting conveyor belt and said offsetting conveyor being adapted to move between an offsetting conveyor centered position, an offsetting conveyor angled position, and an offsetting conveyor offset position;
   (b) an offsetting conveyor swing actuator, said offsetting conveyor swing actuator being adapted to move the offsetting conveyor between the offsetting conveyor centered position and the offsetting conveyor angled position;
   (c) a chute, said chute having a chute feed end and a chute discharge end and said chute being adapted to move between a chute centered position and a chute angled position;
   (d) a chute actuator, said chute actuator being adapted to move the chute between the chute centered position and the chute angled position;
   wherein the offsetting conveyor is pivotally connected to the chute and wherein a vertical offsetting conveyor pivot axis is adapted to be moved between the offsetting conveyor centered position and the offsetting conveyor offset position.

2. The conveyor assembly of claim 1 wherein the offsetting conveyor is pivotally connected to the chute about a vertical offsetting conveyor pivot axis.

3. The conveyor assembly of claim 1 wherein the vertical offsetting conveyor pivot axis is generally vertical.

4. The conveyor assembly of claim 1 wherein the offsetting conveyor moves between the offsetting conveyor centered position and the offsetting conveyor offset position when the chute actuator moves the chute between the chute centered position and the chute offset position.

5. The conveyor assembly of claim 1 wherein the chute is adapted to receive oversize material from a screening assembly.

6. The conveyor assembly of claim 1 wherein the chute is adapted to pivotally move about a chute pivot axis.

7. The conveyor assembly of claim 6 wherein the chute pivot axis is disposed generally vertically and adjacent to the chute feed end.

8. The conveyor assembly of claim 6 wherein the chute is adapted to pivotally move such that the chute discharge end is disposed above the offsetting conveyor when the chute is in the chute angled position and the offsetting conveyor is in the offsetting conveyor offset position.

9. The conveyor assembly of claim 1 further comprising an offsetting conveyor pivot bracket.

10. The conveyor assembly of claim 1 wherein the offsetting conveyor pivot bracket is pivotally connected to the chute about a bracket pivot axis.

11. The conveyor assembly of claim 10 wherein the bracket pivot axis is disposed generally vertically and adjacent to the chute discharge end.

12. The conveyor assembly of claim 10 wherein the offsetting conveyor pivot bracket is adapted to pivotally move between a range of approximately +/−45 degrees from a bracket centered position about the bracket pivot axis.

13. The conveyor assembly of claim 10 wherein the offsetting conveyor pivot bracket is pivotally moved about the bracket pivot axis by the offsetting conveyor swing actuator.

14. The conveyor assembly of claim 1 wherein the tail end of the offsetting conveyor is pivotally connected to the conveyor pivot bracket about a horizontal offsetting conveyor pivot axis.

15. The conveyor assembly of claim 14 wherein the horizontal offsetting conveyor pivot axis is disposed generally horizontally and adjacent to the chute discharge end.

16. The conveyor assembly of claim 14 wherein the offsetting conveyor is adapted to pivotally move between a range of approximately 25 degrees about the horizontal offsetting conveyor pivot axis.

17. The conveyor assembly of claim 14 wherein the offsetting conveyor is pivotally moved about the horizontal offsetting conveyor pivot axis by an offsetting conveyor vertical actuator.

18. The conveyor assembly of claim 1 wherein the offsetting conveyor is adapted to convey material from a screening assembly to a crushing assembly.

19. The conveyor assembly of claim 1 wherein the offsetting conveyor is adapted to convey material from a screening assembly to a stockpile.

20. The conveyor assembly of claim 1 further comprising a feed conveyor, said feed conveyor having a feed conveyor tail end and a feed conveyor belt.

21. The conveyor assembly of claim 20 wherein the feed conveyor is adapted to convey material from a crushing assembly to a screening assembly.

22. A method for offsetting a conveyor, said method comprising:
   (a) providing a conveyor assembly adapted to convey material, said conveyor assembly comprising:
      (i) an offsetting conveyor, said offsetting conveyor having an offsetting conveyor tail end, an offsetting conveyor swing end, and an offsetting conveyor belt and said offsetting conveyor being adapted to move between an offsetting conveyor centered position, an offsetting conveyor angled position, and an offsetting conveyor offset position;

(ii) an offsetting conveyor swing actuator, said offsetting conveyor swing actuator being adapted to move the offsetting conveyor between the offsetting conveyor centered position and the offsetting conveyor angled position;
(iii) a chute, said chute having a chute feed end and a chute discharge end and said chute being adapted to move between a chute centered position and a chute angled position;
(iv) a chute actuator, said chute actuator being adapted to move the chute between the chute centered position and the chute angled position;
wherein the offsetting conveyor is pivotally connected to the chute and wherein a vertical offsetting conveyor pivot axis is adapted to be moved between the offsetting conveyor centered position and the offsetting conveyor offset position; and,
(b) moving the offsetting conveyor between the offsetting conveyor centered position and the offsetting conveyor offset position.

* * * * *